United States Patent [19]
Hoge

[11] Patent Number: 5,930,158
[45] Date of Patent: Jul. 27, 1999

[54] PROCESSOR WITH INSTRUCTION SET FOR AUDIO EFFECTS

[75] Inventor: Stephen Hoge, Santa Cruz, Calif.

[73] Assignee: Creative Technology, Ltd, Singapore, Singapore

[21] Appl. No.: 08/886,920

[22] Filed: Jul. 2, 1997

[51] Int. Cl.[6] .................................................. G06F 7/00
[52] U.S. Cl. ..................................................... 364/715.03
[58] Field of Search ........................... 364/715.03, 722, 364/748.18, 748.5, 749; 341/75, 50, 89

[56] References Cited

U.S. PATENT DOCUMENTS

| | | | |
|---|---|---|---|
| 4,472,993 | 9/1984 | Futamase et al. | 84/1.24 |
| 4,583,180 | 4/1986 | Kmetz | 364/715.03 |
| 5,038,309 | 8/1991 | Priem et al. | 364/715.03 |
| 5,111,727 | 5/1992 | Rossum | 84/603 |
| 5,257,215 | 10/1993 | Poon | 364/715.03 |
| 5,342,990 | 8/1994 | Rossum | 84/603 |
| 5,365,465 | 11/1994 | Larson | 364/715.03 |
| 5,376,752 | 12/1994 | Limberis et al. | 84/622 |
| 5,652,584 | 7/1997 | Yoon | 341/89 |

OTHER PUBLICATIONS

Peter Glakowsky, "Crystal SLIMD Speeds PCI Audio," Microprocessor Resources, pp. 13–15, Mar. 31, 1997.

Alex Limberis et al, "Real Time Controllers for Exceptionally Expressive Performance," Audio Engineering Society, 95th Convention in New York, pp. 1–5, Oct. 1993.

*Primary Examiner*—Chuong Dinh Ngo
*Attorney, Agent, or Firm*—Townsend and Townsend and Crew LLP; Clifford B. Perry

[57] ABSTRACT

An instruction set for control of an audio signal processor that allows for a high degree of flexibility in generating desired sound effects. The instruction set serves as a multifunctional instruction base upon which other specialized sound effects can be constructed.

10 Claims, 11 Drawing Sheets

| A | X | Y | Result |
|---|---|---|---|
| A | X | Y | (A AND X) XOR Y |
| A | X | 0 | A AND X |
| A | 0xFFFFFF | Y | A XOR Y |
| A | 0xFFFFFF | 0xFFFFFF | NOT A |
| A | X | ~X | A OR Y |
| A | X | 0xFFFFFF | A NAND X |

$$\begin{aligned}
\text{Form 1:} \quad & (S*Z*M*B*N * \overline{S}*Z*\overline{M}*\overline{B}*N) + (S*Z*M*B*N * \overline{S}*Z*\overline{M}*\overline{B}*N) + (S*Z*M*B*N * \overline{S}*Z*\overline{M}*\overline{B}*N) \\
\text{Form 2:} \quad & (S+Z+M+B+N + \overline{S}+Z+\overline{M}+\overline{B}+N) * (S+Z+M+B+N + \overline{S}+Z+\overline{M}+\overline{B}+N) * (S+Z+M+B+N + \overline{S}+Z+\overline{M}+\overline{B}+N) \\
\text{Form 3:} \quad & (S*Z*M*B*N + \overline{S}*Z*\overline{M}*\overline{B}*N) + (S*Z*M*B*N + \overline{S}*Z*\overline{M}*\overline{B}*N) + (S*Z*M*B*N + \overline{S}*Z*\overline{M}*\overline{B}*N) \\
\text{Form 4:} \quad & (S+Z+M+B+N * \overline{S}+Z+\overline{M}+\overline{B}+N) * (S+Z+M+B+N * \overline{S}+Z+\overline{M}+\overline{B}+N) * (S+Z+M+B+N * \overline{S}+Z+\overline{M}+\overline{B}+N)
\end{aligned}$$

$\longleftarrow 720$

Fig. 7B

PROCESSOR WITH INSTRUCTION SET FOR AUDIO EFFECTS

STATEMENT OF RELATED APPLICATIONS

The following two commonly-owned applications are being filed concurrently and each is incorporated herein by reference in its entirety for all purposes:

"AUDIO EFFECTS PROCESSOR HAVING DECOUPLED INSTRUCTION EXECUTION AND DELAY MEMORY SEQUENCING," Stephen Hoge inventor (Attorney Docket 17002-92); and "AUDIO EFFECTS PROCESSOR WITH MULTIPLE ASYNCHRONOUS AUDIO STREAMS," David P. Rossum and Scott Fuller inventors (Attorney Docket 17002-86).

BACKGROUND OF THE INVENTION

This invention relates to an instruction set for controlling a signal processor and particularly to an instruction set for controlling a sound effects audio signal processor within an audio system.

Sound effects audio signal processors (ASPs) are commonly used to generate sound effects in a multitude of audio components, some examples being programmable musical instruments, video games, cinema sound systems, virtual reality systems, and computer audio systems.

ASPs create sound effects by executing programs containing a series of instructions. Each instruction directs the ASP to perform a specific logical and/or arithmetic operation on the received signal, resulting in the program's creation of a particular sound effect.

Conventional ASPs, such as that disclosed in U.S. Pat. No. 5,376,7523 to Limberis et. al., incorporated herein by reference, employ instructions primarily designed for use in general purpose digital signal processors (DSPs). General purpose DSP instructions are well-known in the art and include arithmetic instructions such as "Accumulate," "Multiply and Accumulate," as well as logical instructions such as "AND," "OR," and "XOR."

While many ASPs make use of the conventional DSP instructions, instructions with special characteristics are needed to meet the particular demands of processing audio signals. For instance, ASPs require a constant output sample rate since delays in or deviation from the ASP's output sample rate result in unwanted audible gaps or signal distortion. A constant output sample rate is usually ensured by executing the same number of instruction for each sound effects program, where each instruction takes the same amount of time to execute.

Conventional DSP conditional instructions such as IF/ELSE IF/ELSE instructions cannot be easily used in ASPs since the number of executed instructions may not be the same as programs not having the conditional instruction, or the number of executed instructions within the particular program may be different depending upon if the condition is TRUE or FALSE. However, conditional instructions remain valuable programming tools in creating sound effects. Therefore, a need exists for a conditional instruction which when executed, executes the same number of instructions as those programs without the conditional instruction, and will execute the same number of instructions within the program regardless of the whether the condition's result is TRUE or FALSE.

Another requirement particular to ASPs is the conservation of the information content of signals having widely varying magnitudes. Conventional linear to logarithmic conversion DSP instructions, such as the IEEE floating point instruction, generate a logarithmic representation having fixed exponent and mantissa fields. Because the exponent and mantissa fields are of a fixed length, signal information which is stored beyond those fields is lost.

What is needed is a linear to log conversion instruction which can define the exponent and mantissa fields of the log value, so that either field may be expanded or contracted to retain important signal information. Further distinctive from conventional DSPs is the generation of special audio effects and waveshaping. Conventional DSP instructions do not provide the necessary waveshaping operations needed for creation of specialized audio effects.

Special ASP instructions could be added to an existing DSP instruction set, but the addition of a large number of instructions to the existing instruction set may be precluded by the limited size of the ASP's existing instruction memory. Although a small addition may not be precluded, any addition would require the allocation of a larger instruction memory within the ASP, driving up the ASP's fabrication cost.

What is needed is an ASP instruction set having a minimal number of multi-functional instructions, whereby a single instruction can be used to provide both conventional DSP and specialized operations. Further needed is the ability to reuse the instruction's specialized operations to formulate other specialized operations, thereby enabling the creation of a multitude of different sound effects with the same instruction set.

SUMMARY OF THE INVENTION

The invention provides an instruction set for control of an audio signal processor that allows for greater flexibility in generating desired sound effects. The instruction set serves as a multi-functional instruction base upon which other specialized sound effects can be constructed. Many instructions according to the present invention provide complex processing in a single instruction cycle. Also in the case of conditional execution, processing can be made to remain synchronous with programs not possessing conditional instructions.

In one embodiment of the present invention, a method for computing logical operations within a processor includes the steps of receiving a single machine instruction having a first address specifying a first operand, a second address specifying a second operand, and a third address specifying a third operand, and computing in a single instruction cycle a result equivalent to a logical XOR operation between the third operand and an intermediate result of a logical AND operation between the first operand and the second operand.

In another embodiment of the invention, a method is provided for converting linear data into logarithmic data, the method including the steps of receiving a first instruction having a first address for specifying linear data, a second address for specifying a maximum exponent value, and a third address for specifying an output operand, and converting the linear data to logarithmic data by the steps of allocating a Q-bit long exponent field within the output operand, where Q is dependent upon the maximum exponent value, calculating a Q-bit long exponent value, calculating a mantissa value as a result of the calculation of the Q-bit long exponent value, and storing said exponent value and said mantissa value within said output operand.

In a third embodiment of the invention, a method for converting logarithmic data into linear data is presented and includes the steps receiving an instruction having a first address for specifying logarithmic data having an exponent value and a mantissa value, a second address for specifying a maximum exponent value, and converting the logarithmic data to linear data by the steps of defining the exponent value as having Q-bits, where Q is dependent upon the maximum exponent value, extracting said Q-bit long exponent value from the logarithmic data, defining the remaining bits of the logarithmic data as the mantissa value, and normalizing the mantissa value to a linear value.

In a fourth embodiment of the invention, a method is presented for skipping a subsequent instruction upon execution of a single instruction and includes the steps of receiving a first instruction having a first address for specifying status bits, and a second address for specifying a boolean equation, mapping the status bits into a bit string, applying the bit string to the boolean equation; and processing the subsequent instruction as a NULL instruction in the processor when the application of the bit string to the boolean equation results in a TRUE outcome.

A fifth embodiment of the invention provides a method for calculating a linear interpolation between two values A and Y, and includes the steps receiving in a processor a single instruction having a first address specifying a first operand A, a second address specifying a second operand X, and a third address specifying a third operand Y, and computing in a single instruction cycle, responsive to the instruction a result equivalent to A-X(A-Y).

A further understanding of the nature and advantage of the invention herein may be realized by reference to the remaining portions of the specification and attached drawings.

BRIEF DESCRIPTION OF THE DRAWINGS

FIG. 7B depicts four, three term boolean equations used in processing the SKIP instruction in accordance with the invention.

DESCRIPTION OF SPECIFIC EMBODIMENTS

The present invention is applicable to audio signal processors of all kinds. Some of the benefits provided by the invention are a wider degree of programming flexibility in creating sound effects, compatibility with constant rate audio sample generation, and a minimal requisite instruction memory space.

Disclosed herein is an ANDXOR instruction which provides a three operand logical operation resulting in many two operand logical results when one or more of the operands have specified values. Also disclosed is a LOG instruction which provides a linear to a logarithmic conversion whereby the user may define the maximum exponent value and mantissa field of the converted logarithmic value. Further disclosed is a SKIP instruction which provides data movement, conditional and non-conditional instruction execution without program branching, enabling synchronous program execution with programs not containing SKIP instructions. Additionally disclosed is a INTERP instruction which provides calculation of a scaled linear interpolation between two values in a single instruction cycle.

I. Audio Instruction Format

Figure 1:
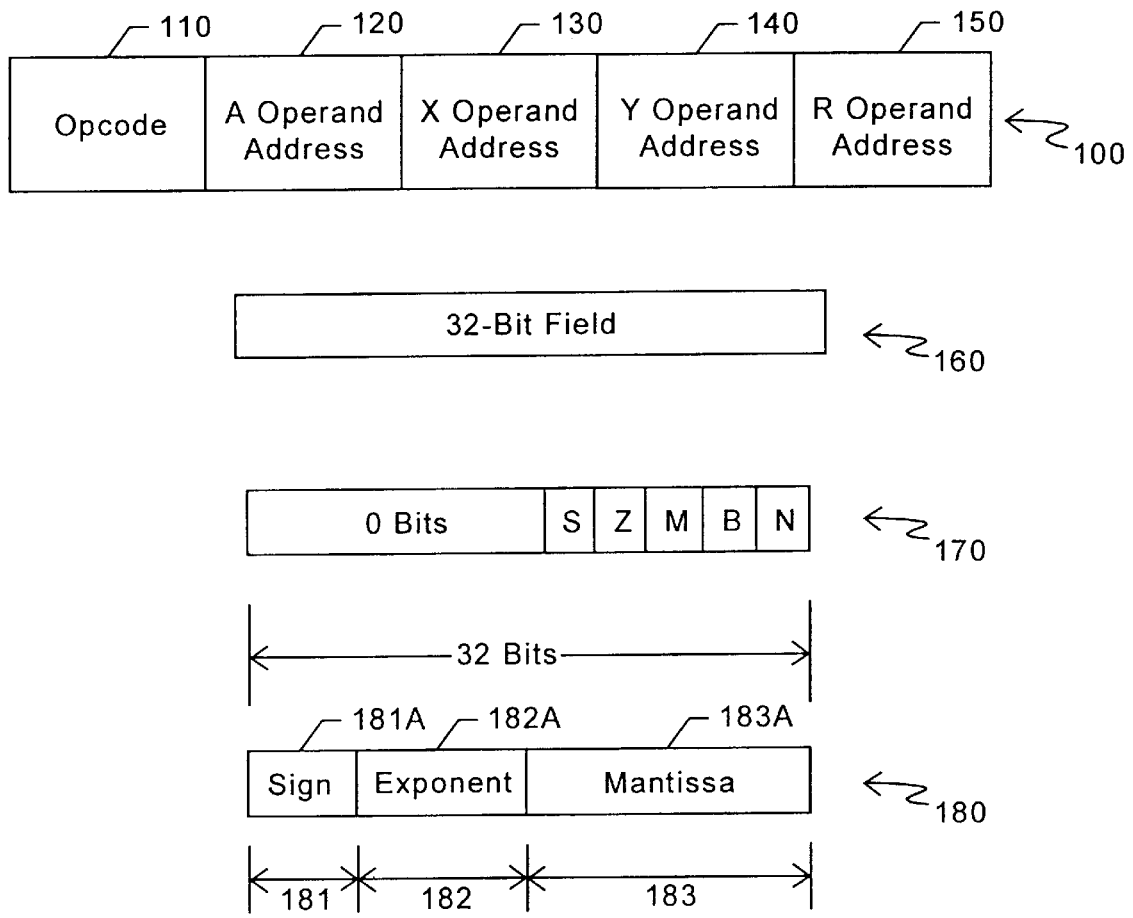
FIG. 1 depicts the instruction and data formats used in accordance with the invention.

It will be useful to begin with a general description of instruction and data format used. FIG. 1 illustrates an instruction format 100 in accordance with the invention. The instruction includes an opcode 110, three input addresses 120, 130, 140, and one output address 150. The opcode 110 specifies the instruction's operation to the processor, and preferably is 4-bits long. Addresses 120, 130, 140 and 150 specify spaces in a General Purpose Register (GPR) memory 230 (FIG. 2) within which data is stored. In the preferred embodiment, addresses 120, 130, 140 and 150 are 10-bits long and data stored at those address are 32-bits long. Data is stored in one of three data formats 160, 170 or 180 as detailed below. The instructions themselves are stored in a separate instruction memory 210, shown in FIG. 2.

II. Audio Processor Architecture

Figure 2:
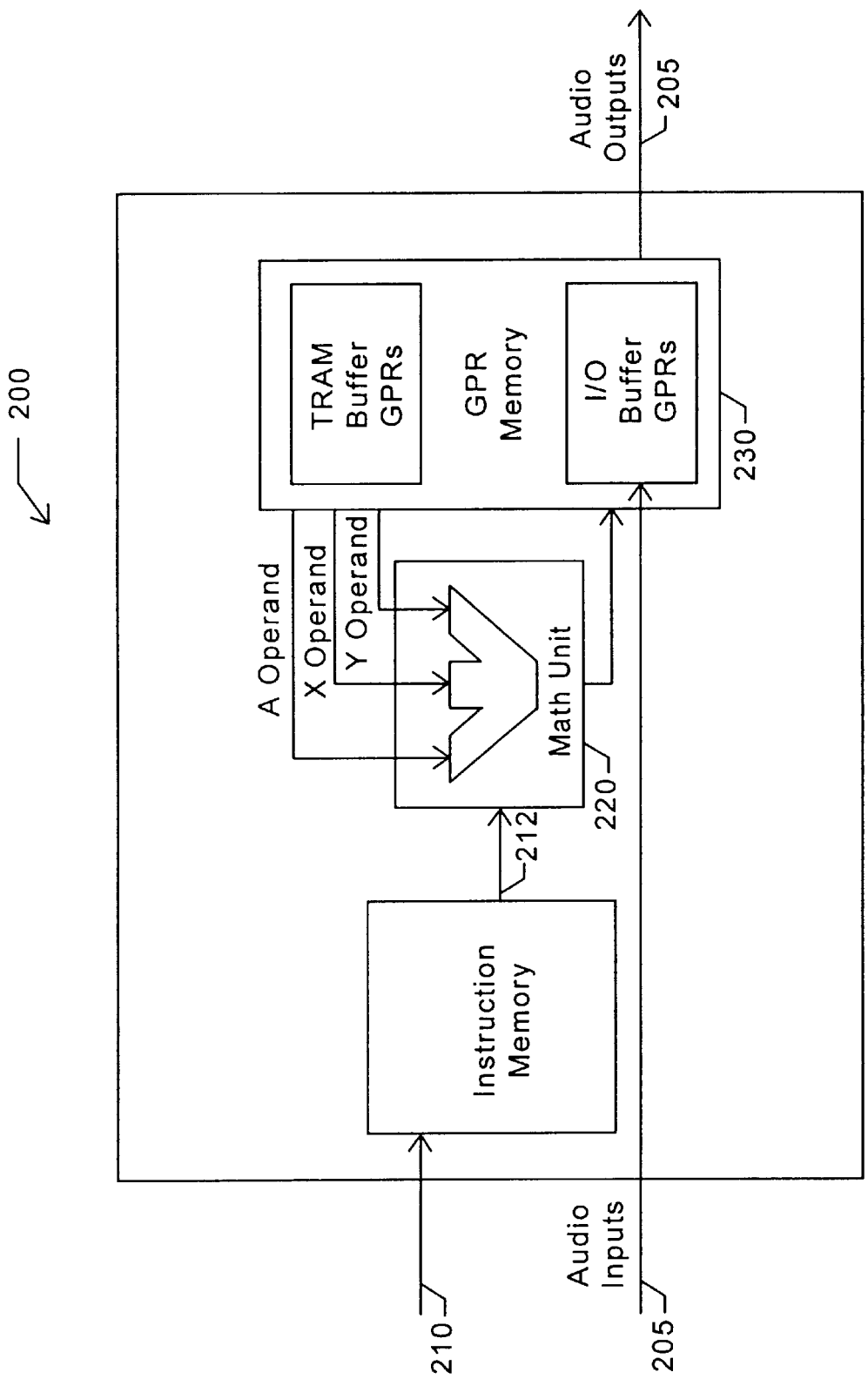
FIG. 2 is a simplified block diagram of an audio signal processor architecture in accordance with the invention.

FIG. 2. illustrates an audio processor architecture for use with instructions having the above-described format. In this embodiment, the processor 200 includes an instruction memory 210 for instruction storage, a general purpose (GPR) memory 230 having an audio input line 205 for data input and storage, and a math unit 220 for performing logical and arithmetic operations.

Figure 3:
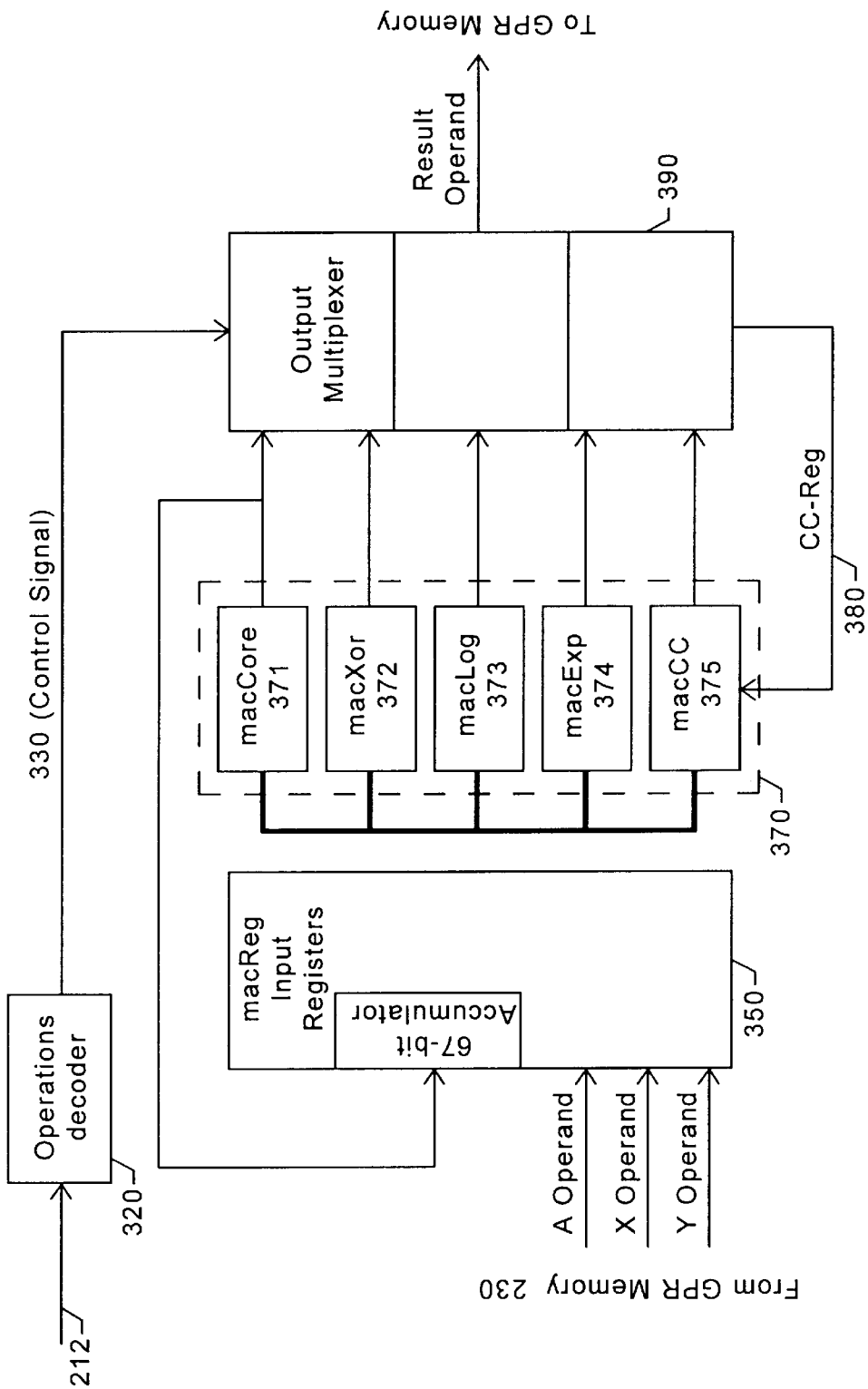
FIG. 3 illustrates a math unit of the previously described audio signal processor architecture in accordance with the invention.

FIG. 3 further details the architecture of the math unit 220 which includes a macReg block 350, a bank of computational units 370, and an output multiplexer 390. The macReg 350 is an input register which holds the input A, X, and Y operands retrieved from GPR memory 230. In the preferred embodiment, the macReg 350 includes a 67-bit accumulator register to store a full-width accumulated result of the last instruction's execution. The result may be used in subsequent operations as described below.

The computational units 370 include a macCore unit 371, a macXor unit 372, a macLog unit 373, a macExp unit 374 and a macCC unit 375. The macCore unit 371 is the primary multiplier/accumulator execution unit and performs fractional or integer multiplication with positive or negative accumulation. The macXor, macLog, macExp and macCC units 372, 373, 374 and 375 perform particular arithmetic and/or logical operations on the supplied data.

The math unit 220 also includes an operation decoder 320 and an output multiplexer 390. The operation decoder receives the instruction 212, reads the instruction's opcode 110, and transmits a control signal 330 to an output multiplexer 390. Responsive to the control signal 330, the output multiplexer selects one of the five inputs supplied to it by the macCore, macXor, macLog, macExp, and macCC units 371, 372, 373, 374 and 375. The selected input is outputted as the R operand and is written to the R operand address 150 within the GPR memory 230.

Upon output of the R operand, the output multiplexer 390 generates a Condition Code operand (cc_reg operand) 380 which is latched into the macCC unit 375. The cc_reg operand 380 is a record of the status/condition of the resulting data (R operand), and consists of five condition code or "CC-bits." In the preferred embodiment, five CC-bits are used to monitor the resultant data: Borrow, Saturate, Minus, Zero and Normalized. When high, the "Borrow" bit indicates the result of any subtraction has underflowed; the "Saturate" bit indicates the R operand has overflowed its 32-bit field; the "Minus" bit indicates the result is negative; the "Zero" indicates all zeros have been written to the specified R operand address; and the "Normalized" bit indicates the R operand has undergone a binary point normalization. Each cc_reg operand may contain all, several or none of the condition bits as explained below. While it is understood that all cc_reg operands may not contain all five CC-bits, it will be assumed so for purposes of this description. The cc_reg operands are stored in the format 170, shown in FIG. 1.

In operation, the math unit 220 receives an instruction 212 from an instruction memory 210 to perform a particular operation on audio data stored in GPR memory 230. The instruction 212 includes an opcode 110, and the GPR address locations 120, 130 and 140 of input operands A, X and Y to be processed. Additionally included in the instruction 212 is a R operand address 150 where the result of the processing is to be written.

The math unit 220 retrieves the A, X, and Y operands from the GPR memory 230 and stores the data in the macReg 350 (FIG. 3). The macReg 350 supplies these operands to the computational units 371, 372, 373, 374 and 375 when requested. In the preferred embodiment, each computation unit receives the A, X, and Y operands in parallel. The macCore, macXor, macLog, macExp, and macCC units 371, 372, 373, 374, and 375 each generates its own output, which are supplied to the output multiplexer 390.

A operation decoder 320 receives the instruction 212, reads the instruction opcode 110, and sends a control signal 330 to the output multiplexer 390 controlling which output of the computational units 370 will be selected. The output multiplexer 390 writes the selected data as the R operand to the address location 150 specified in the instruction 212. A cc_reg operand 380 indicating the status of the R operand is saved to the macCC unit 375, as described above.

In the preferred embodiment, the aforementioned steps of receiving an instruction 212 from the instruction memory 210, retrieving the A, X and Y operands from GPR memory 230, generating outputs from the computational units, selecting the desired output, writing the R operand to the GPR address specified in the instruction's R operand address 150, and storing a cc_reg operand 380 in the macCC unit 375, collectively occur in one instruction cycle.

III. Audio Instructions and Processor Operation

The audio instructions will now be described with reference to the audio signal processor shown in FIGS. 1 and 2. The present instructions, however, are not limited to this particular audio processor, and the instruction's execution in conjunction therewith is intended only as one of many possible implementations of the audio instructions.

The audio processor 200 operates using a set of instructions stored within the instruction memory 210 having the above-described format 100, FIG. 1. In the preferred embodiment, the stored instruction set includes general purpose instructions and special instructions, both of which are described below.

A. ANDXOR Instruction

The ANDXOR instruction allows calculation of a variety of different logical results using a single logical instruction. The ANDXOR instruction 212 has an instruction format 100 shown in FIG. 1.

Figures 4A, 4B:
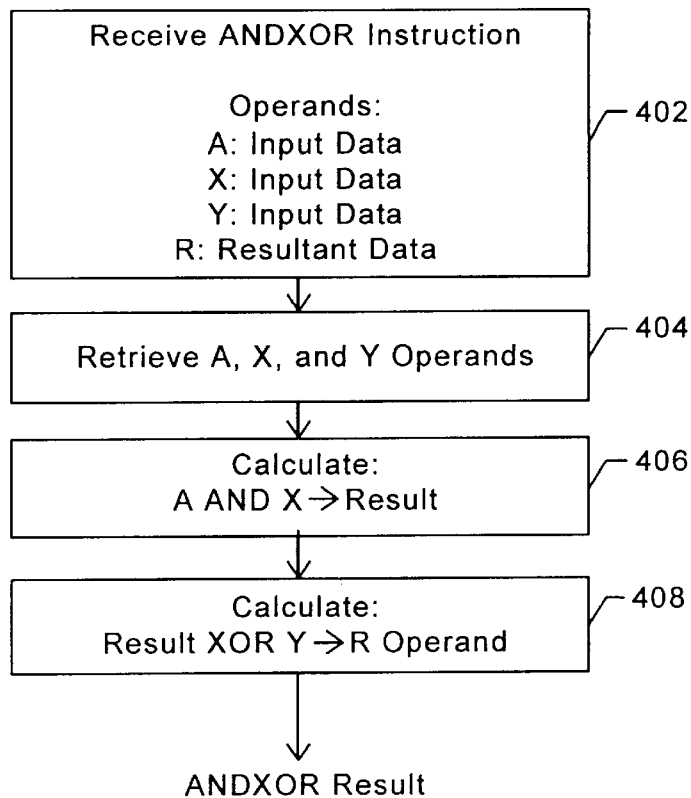
FIG. 4A is a flow chart of an ANDXOR instruction in accordance with the invention.
FIG. 4B is a table describing the input values and output results of the ANDXOR instruction in accordance with the invention.

Instruction operation is described in the flowchart of FIG. 4A. At step 402, an ANDXOR instruction specifying three input operands A, X and Y, and one output operand R is received into the processor. In the preferred embodiment, the A, X and Y operands have the data format 160. Next, the specified A, X and Y operands are retrieved. Subsequently, two logical operations are performed. The first logical operation (step 406) is a logical AND operation on the A and X operands. An XOR operation is subsequently performed (step 408) on the first result and the Y operand, yielding a second result. The second result is described by the equation 2:

$$\text{Result} = (A \text{ AND } X) \text{XOR } Y \qquad (2)$$

In the preferred embodiment, the macXor unit 372 calculates equation 2.

Referring to the audio processor of FIG. 3, a control signal 330 is transmitted from the operation decoder 320 in response to the ANDXOR opcode and directs the multiplexer 390 to select the macXor output. The macXor output is written to the address specified in the R operand address 150. A cc_reg operand 380 indicating the status of the R operand is saved to the macCC unit 375. In the preferred embodiment, the stored cc_reg operand 380 is saved in the format 170 as shown in FIG. 1 and consists of the aforementioned Minus, Zero and Normalized CC-bits. Additionally preferred is that the steps of receiving the instruction, retrieving the A, X, and Y operands, performing the first and second logical operations and generating a result, selecting the result, writing the result to the R operand address, and saving to the macCC unit a cc_reg operand corresponding to the result collectively occur within one instruction cycle.

FIG. 4B illustrates the ANDXOR instruction's results. The ANDXOR instruction always performs the three operand instruction as shown in equation 2 above. However, when the X or Y operands are particular values, the result is equivalent to other useful logical operations. For instance, if the Y operand is a binary word composed of all zero bits, the macXor unit 372 performs an AND logical operation on the A and Y operands. If the X operand is composed of all one-bits, the macXor unit 372 performs a XOR logical operation on the A and Y operands. In this manner, the ANDXOR instruction can be used to perform a variety of logical operations normally requiring separate instructions.

Figure 4C:
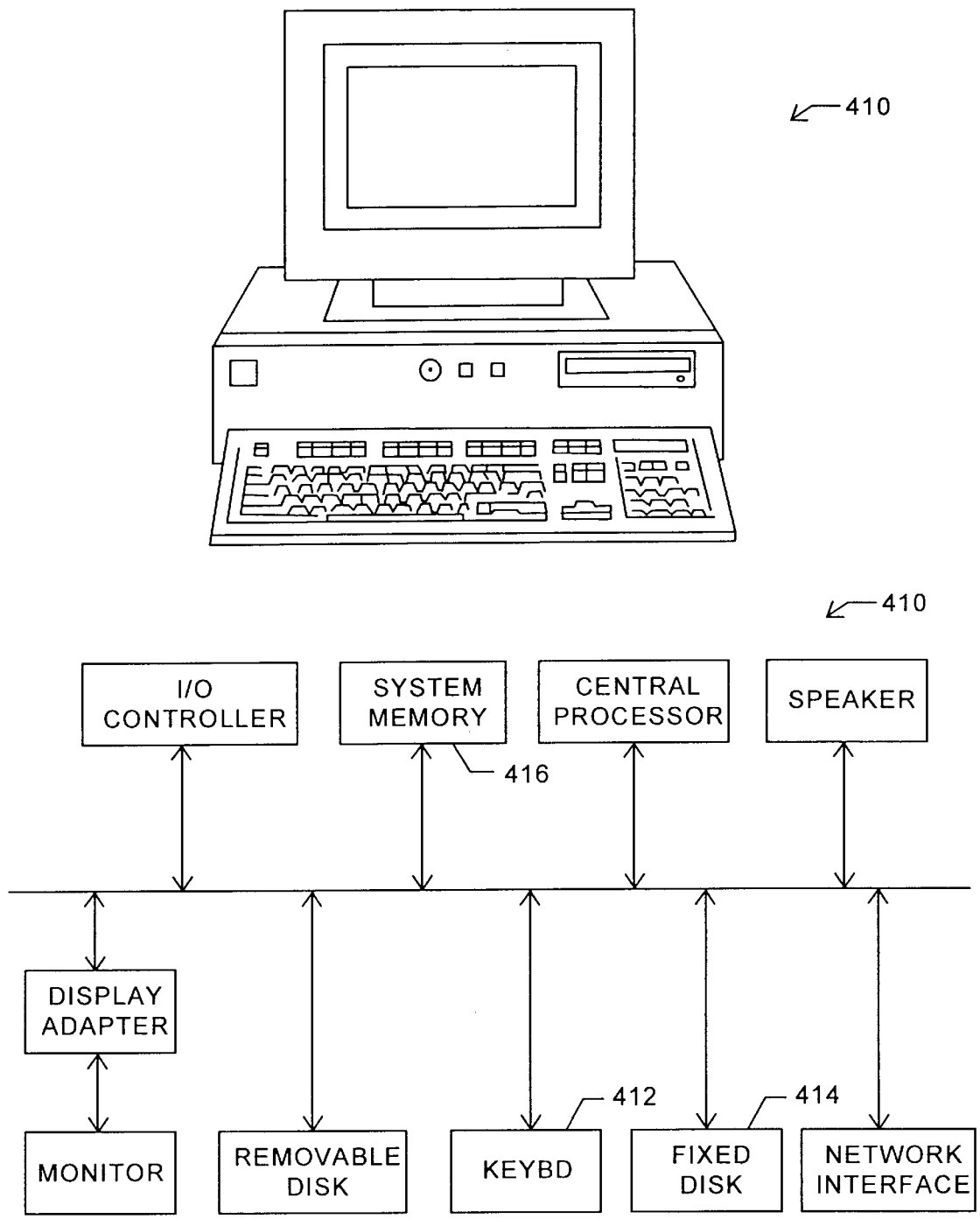
FIG. 4C depicts a simplified computer system for compiling source code into the ANDXOR instruction in accordance with the invention.

The ANDXOR instruction may be generated by a compiler from other logical operations specified by source code. FIG. 4C illustrates a simplified representation of an internal architecture of a personal computer 410 for compilation of simple source code logical operations into the ANDXOR instruction. Computer 410 includes a keyboard 412, a fixed disk 414 in which a compiler program is operatively disposed, and a system memory 416. Of course, many other computer configurations could be used with the present invention.

Via the keyboard 412, the user enters a particular logical operation, such as "A AND B" in a source code language such as FORTRAN or C. Upon compilation, the compiler program translates the logical operation into an ANDXOR instruction containing the ANDXOR instruction opcode, the result address field, input address fields for the variables A and B, and a third input address field specifying a binary zero word. When the compiled instruction is executed within a processor such as the audio signal processor described herein, the result becomes A AND B as originally composed in the source code.

Other logical operations may be implemented using the ANDXOR instruction through the above described method. For instance, the logical operation "A XOR B" can be entered in a source code language, which upon compilation, is translated into the ANDXOR instruction having an X operand of all binary ones. A "A NAND X" operation can be obtained using source code compiled into the ANDXOR instruction having a Y operand of all binary one-bits. Similarly, a "NOT A" operation is calculable in source code by compiling the source code into an ANDXOR instruction when the X and Y operands are both composed of all binary one bits.

The logical operation "A OR Y" may be obtained using source code which when compiled specifies an X operand and the negation of the X operand as the Y operand. The negated X operand may either be specified by the programmer if the value has been predefined, or the compilation can occur in two steps where the X operand is determined first and loaded and its negation is determined second and loaded as the Y operand.

B. LOG Instruction

The LOG instruction is a linear to logarithmic conversion instruction in which the user can define the maximum exponent value and the mantissa length of the converted logarithmic value. The instruction is useful in dynamic signal processing where linear to log dB conversions are necessary. Additionally, by allowing the programmer to vary the maximum exponent value of the logarithmic audio data, the LOG instruction can also be used to construct a wide variety of waveshapes and special audio effects.

Figure 5:
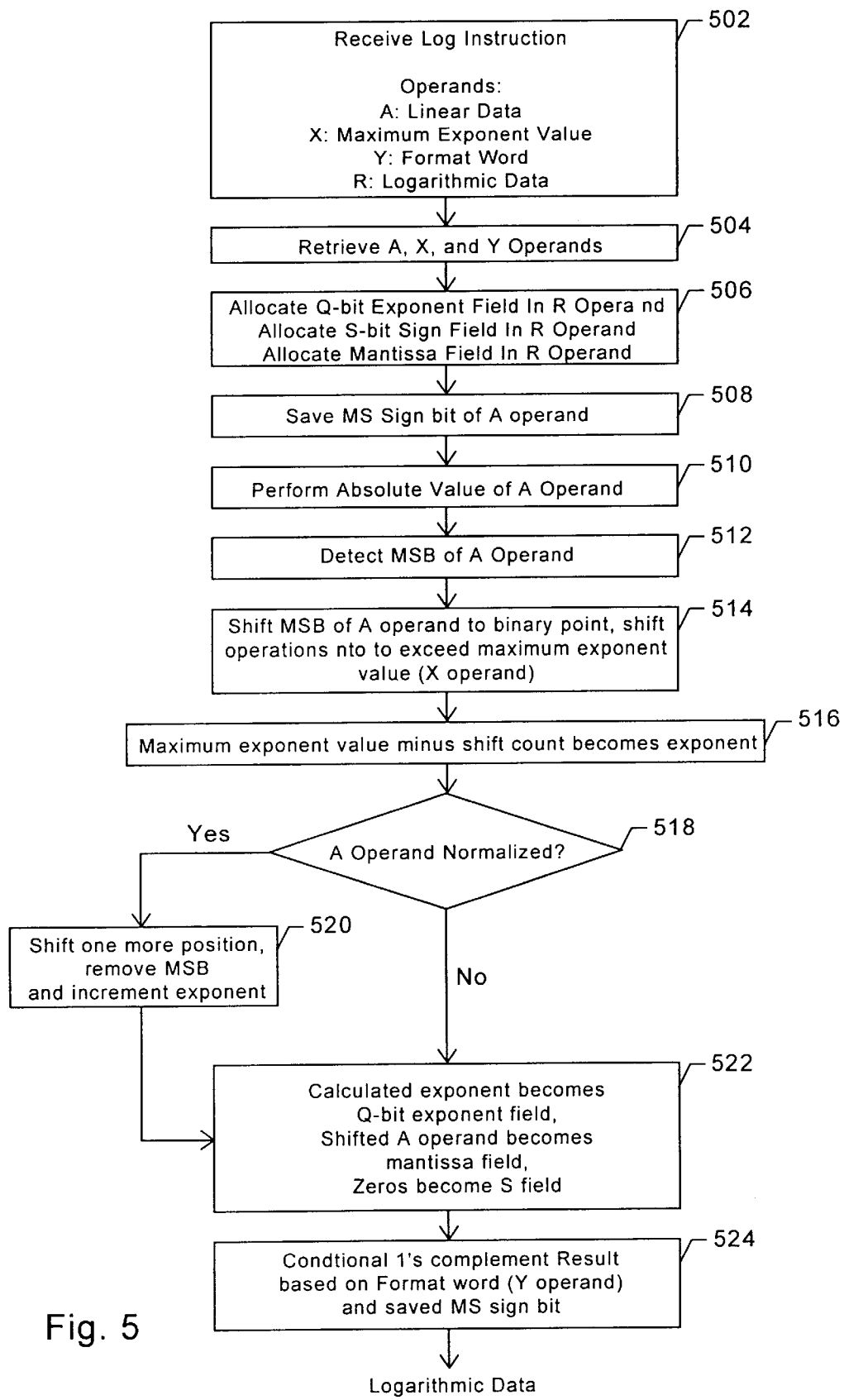
FIG. 5 is a flowchart of a LOG instruction in accordance with the invention.

FIG. 5 is a flowchart which describes the operation of the LOG instruction. At step 502, a LOG instruction is received which specifies three input operands A, X and Y, and one output operand R. The A operand is the linear data to be converted; the X operand specifies the maximum allowable exponent value of the converted logarithmic data; the Y operand is a format word which controls the arithmetic sign of the resulting logarithmic data; and the R operand is the resulting logarithmic data.

The logarithmic data (R operand) has a data format 180 shown in FIG. 1. The data format 180 includes a sign field 181, an exponent field 182, and a mantissa field 183.

Once the LOG instruction is received into the processor, the A, X and Y operands are retrieved at step 504. Subsequently at step 506, Q-bits are allocated to the exponent field 182 of the R operand, where Q is derived from the maximum exponent value (X operand). In the preferred embodiment, Q is the minimum number of bits needed to represent the maximum exponent value. In the preferred embodiment, Q ranges from 2 to 5 bits, allowing a maximum exponent value of 2 to 31.

Also at step 506, S bits are allocated to a sign field 181 of the R operand to indicate the sign of the logarithmic data. Inclusion of the sign bit allows pseudo-logarithmic conversion of negative values equivalent to applying an absolute value function on A operands having negative values, applying the logarithmic conversion, and then performing sign restoration or transformation to create a signed result operand R. In the preferred embodiment, S is 1, allowing a sign field one bit wide.

The remaining bit spaces in the R operand 180 form the mantissa field 183 as shown in step 506. In the preferred embodiment, the mantissa field is 26–29 bits wide.

Once the sign, exponent, and mantissa field widths 181, 182 and 183 are defined within the R operand 180, the actual logarithmic value, defined by the exponent value 182A and mantissa 183A is calculated. First in step 508, the sign of the linear data is stored. Next in step 510, an absolute value function is applied to the linear data. The linear data is subsequently normalized by shifting its most significant non-zero bit until it reaches the binary point or until the number of shifts equals the maximum exponent value (X operand), as shown in steps 512 and 514. A temporary exponent value is formed by subtracting the number of shifts from the maximum exponent value (step 516).

The mantissa 183A of the R operand 180 results from the shifted bits of the normalized data. If the number of shifts required for normalization is less the maximum exponent value (step 520), the most significant bit of the normalized data is removed, the data is shifted one additional position, and the temporary exponent value is increased by one. In this case, the mantissa is said to posses an "implied 1" in a position one bit more significant than that actually retained by the mantissa value 183A.

If the mantissa field 183 has insufficient bit spaces to accommodate all of the mantissa bits 183A (step 522), the outstanding least significant bits are truncated. The final shifted and truncated mantissa value forms the mantissa 183A of the R operand 180. The last temporary exponent value becomes the exponent value 182A and is stored in the exponent field 182 of the R operand 180.

Finally, the two least significant bits (LSB) of the format word (Y operand) are examined along with the stored sign bit 181A of the original linear data to determine what sign transformation to apply to the R operand 180. The R operand 180 is transformed into its binary 1's complement value (step 524) if the two LSBs of the format word are "00" and the original sign bit 181A is "1", or if the format word bits are "11" and the original sign bit 181A is "0", or if the format word bits are "10". In all other cases the transformation preserves the original values of the sign, exponent value and mantissa 181A, 182A and 183A. The output of the transformation is the R operand 180.

In the preferred embodiment, the above-mentioned steps of allocating the exponent, sign and mantissa fields, calculating the exponent value and mantissa of the logarithmic data, and performing the sign transformation are executed within the macLog unit 373. The resulting logarithmic data (R operand) is outputted by the macLog unit 373.

Referring now to the audio processor of FIG. 3, a control signal 330 is transmitted from the operation decoder 320 in response to the LOG opcode and directs the multiplexer 390 to select the macLog output. The macLog output containing the logarithmic data is written to the address specified in the R operand address 150. A cc_reg operand 380 indicating the status of the R operand is saved to the macCC unit 375. In the preferred embodiment, the cc_reg operand is saved in the format 170 as shown in FIG. 1 and consists of the aforementioned Minus, Zero and Normalized CC bits.

Additionally preferred is that the steps of receiving the LOG instruction, retrieving the A, X and Y operands, allocating Q-bits to an exponent field of the R operand based on the value of the X operand, allocating S-bits to a sign field of the R operand, allocating the remaining bits to a mantissa field of the R operand, calculating the exponent value and mantissa of the logarithmic data, performing the sign transformation, storing the logarithmic data as the R operand to the specified address, and saving to the macCC unit a cc_reg operand corresponding to the logarithmic data collectively occur within one instruction cycle.

C. EXP Instruction

The EXP instruction is used to convert logarithmically encoded data, like that produced as the output of the LOG instruction, back into a linear representation. Note that executing the EXP instruction on logarithmic data previously converted by the LOG instruction may not reconstruct the original linear data perfectly, since during the logarithmic conversion some signals may exceed the allowed mantissa width and some less significant bits will be lost. After reconversion with the EXP instruction, the loss of the less significant bits may result in the reconverted linear data differing in small magnitude from the original linear data.

Figure 6:
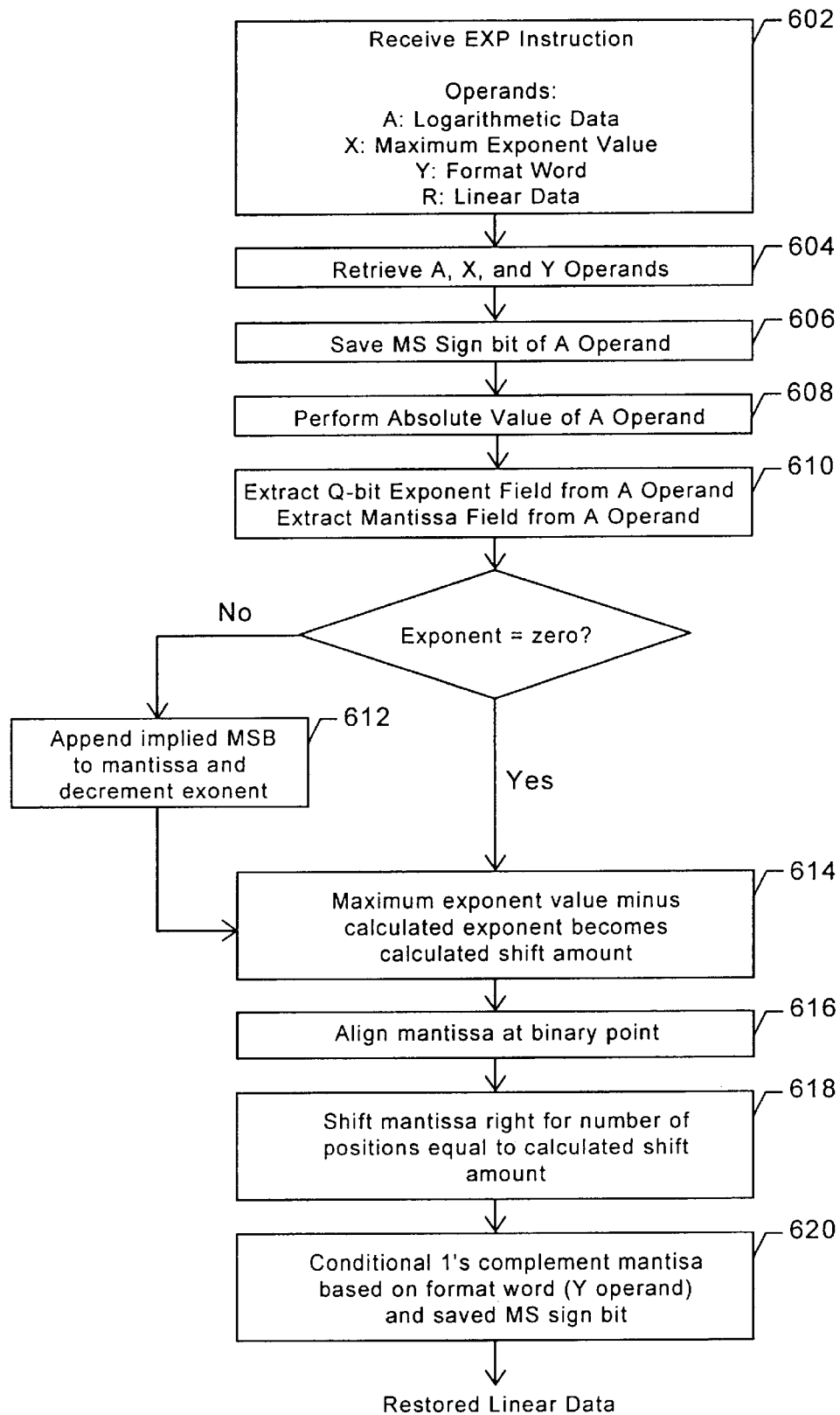
FIG. 6 is a flowchart of an EXP instruction in accordance with the invention.

FIG. 6 illustrates the operation of the EXP instruction. Initially at step 602, an EXP instruction specifying the EXP opcode, three input operands A, X and Y, and one output operand R is received into the processor. The A operand is the logarithmic data to be converted; the X operand specifies the maximum possible exponent value of the logarithmic data; the Y operand is a format word which controls the arithmetic sign of the resulting linear data; and the R operand is the resulting linear data.

The logarithmic data (A operand) has a data format 180 shown in FIG. 1. The data format 180 includes an S-bit wide sign field 181, a Q-bit wide exponent field 182, and a mantissa field 183. In the preferred embodiment, S is 1, allowing for a one bit wide sign field.

Once the EXP instruction is received into the processor, the A, X and Y operands are retrieved (step 604). Next in step 606, the most significant bit of the S-bit sign field 181 of the logarithmic data in the A operand is examined, and stored away for future use. In the preferred embodiment, if the bit is a '1' then a binary 1's complement operation is applied to the A operand data and the result is stored in an Input operand. If the bit is a '0', then the Input operand receives an unaltered copy of the A operand data.

Subsequently in step 608, an absolute value operation is applied to the Input operand. Next, Q-bits of the exponent field 182 of the Input operand are defined and extracted (step 610). The defined and extracted Q-bits are based on the maximum exponent value (X operand). In the preferred embodiment, Q is the minimum number of bits needed to represent the maximum exponent value. In the preferred embodiment, Q ranges from 2 to 5 bits, allowing a maximum exponent value of 2 to 31.

The mantissa value 183A, which is by definition all the bits in the logarithmic word 180 that are less significant than the exponent field, is extracted from the mantissa field 183 of the Input operand (step 610). If the extracted exponent value is not zero, a '1' bit is appended to the mantissa in the most significant bit position, and the exponent value is decreased by 1, as shown in step 612. The appended '1' bit restores the original mantissa's most significant "implied 1." The resulting exponent value is then subtracted from the maximum exponent value (X operand), resulting in a shift count, which ranges from zero to the maximum exponent value (step 614).

The resulting mantissa value is aligned at position N-1 of an N bit linear format word 160, producing a positive, normalized 2's complement linear value (step 616). In the preferred embodiment, N=32. The bits in the linear word which are less significant than the mantissa bits are comprised of zeros. The normalized linear word is then shifted in a less-significant direction for a number of bit positions equal to the shift count, resulting in a de-normalized linear value (step 618).

Finally, the least significant two bits of the format word (Y operand) are examined along with the stored sign bit of the original logarithmic data to determine what sign transformation to apply to the de-normalized linear value. The linear value is transformed into its binary 1's complement (step 620) if the format word bits are "00" and the original sign bit is "1", or if the format word bits are "11" and the original sign bit is "0", or if the format word bits are "10". In all other cases the transformation preserves the original bit values of the de-normalized linear value. The output of the transformation represents the final value of the R operand 180.

In the audio processor shown in FIG. 3, the above steps of logarithmic to linear conversion are performed in the macExp unit 373. The macExp unit 373 then outputs the restored linear data for selection by the output multiplexer 390.

After the macExp unit 373 outputs the restored linear data, a control signal 330 is transmitted from the operation decoder 320 in response to the EXP opcode and directs the multiplexer 390 to select the macExp output. The macExp output is written to the address specified in the R operand address 150. A cc_reg operand 380 indicating the status of the R operand is saved to the macCC unit 375. In the preferred embodiment, the cc_reg operand 380 is saved in the format 170 as shown in FIG. 1 and consists of the aforementioned Minus, Zero and Normalized CC-bits.

Additionally preferred is that the steps of receiving the EXP instruction, deriving the exponent, shifting the mantissa, optionally complementing the restored linear data, selecting the restored data output, writing the restored linear data to a specified R operand address, and storing to the macCC unit a cc_reg operand corresponding to the restored linear data collectively occur within one instruction cycle.

C. SKIP Instruction

The SKIP instruction is used for data movement and execution of instructions without program branching. Instruction execution without program branching is obtained by processing each skipped instruction as a null instruction, further explained below. Data movement occurs as a consequence of implementing the SKIP instruction, further explained below. The SKIP instruction has the instruction format 100 as shown in FIG. 1.

Figure 7A:
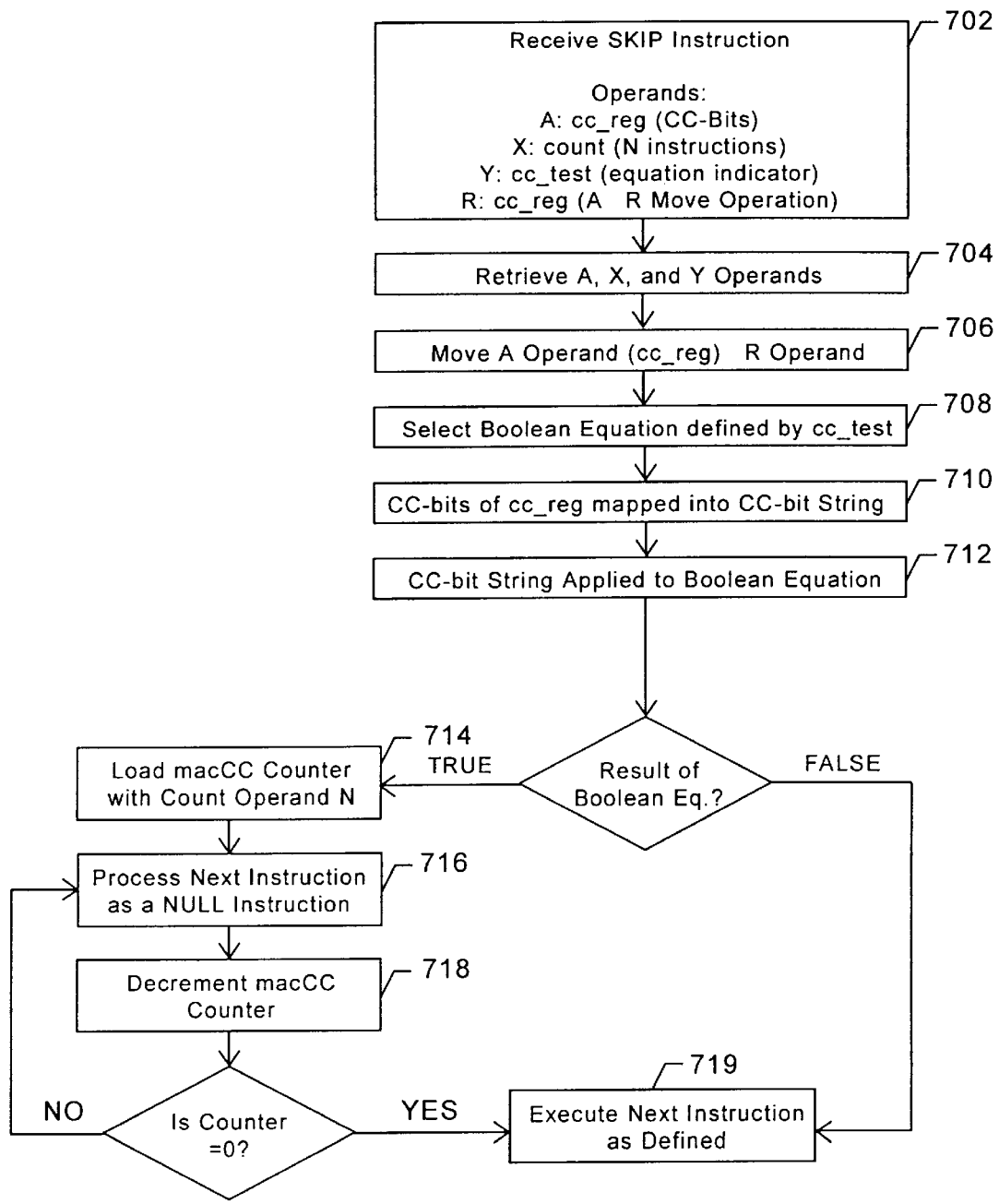
FIG. 7A is a flowchart of a SKIP instruction in accordance with the invention.

FIG. 7A shows a flowchart of the SKIP instruction. At step 702, a SKIP instruction specifying three input operands A (cc_reg), X (count), and Y (cc_test) and output operand R is received into the processor 200. The A operand (cc_reg operand) contains the aforementioned CC-bits (Borrow, Saturate, Minus, Zero and Normalized) which indicate the status of previously outputted R operand. The cc_reg operand is saved in the data format 170 shown in FIG. 1.

The X operand (count operand) identifies the number of instructions to be skipped if an equation specified by the Y operand (cc_test) has a TRUE outcome. Both the cc_test and count operands are store in data format 160.

Once the SKIP instruction is received, the cc_reg, count and cc_test (A, X and Y) operands are retrieved in step 704. In the audio processor shown in FIG. 3, the count and cc_test operands are retrieved from GPR memory 230. The cc_reg operand may be retrieved either from the macCC unit 375 or from the GPR memory 230. The cc_reg operand 380 stored in the macCC unit 375 contains the Condition Code bits from the R operand generated from last executed instruction. The cc_reg operand stored in the GPR memory 230 contains Condition Code bits of an earlier instruction's result. Storage within the GPR memory 230 is accomplished by a secondary MOVE operation of the SKIP instruction, described below, or by any other instruction whose output is an appropriate bit pattern for application as the cc_reg operand of a subsequent SKIP instruction. Selection of the desired cc_reg operand is accomplished by specifying an address in the A operand address 120 corresponding to the GPR memory 230 or macCC unit 375 address location.

The SKIP instruction provides a secondary MOVE operation whereby the A operand (cc_reg) is moved to R operand (step 706). In the audio processor shown in FIG. 3, the cc_reg operand is written to the R operand address 150 in GPR memory 230. If the cc_reg operand was retrieved from the macCC unit 375, it will be moved to the GPR memory address 150 specified in the R operand. In this manner, a previous instruction's cc_reg operand which has been stored in the macCC unit 375 can be moved into the GPR memory 230 for later retrieval using the SKIP instruction.

Once the cc_test, count and cc_reg operands are retrieved, a boolean equation is selected by the cc_test operand, shown in step 708. In the preferred embodiment of FIG. 7B, the selected boolean equation 720 is composed of three 10-bit factors. Each factor contains the original five CC-bit terms and their inverses. As shown, each boolean equation is arranged as the sum, product, or combination of the five CC-bits and their inverses, allowing for a variety of different testing conditions.

In the preferred embodiment, the cc_test operand is also stored in the data format 160 and includes a 2-bit field to identify which one of the four possible forms of boolean equations should be used for the test. The remaining bits of the cc_test operand indicate the mapping of the original 5 CC-bits and their inverses into the 30 1-bit operands of the selected boolean equation.

After a boolean equation is selected, the addressed cc_reg operand supplies its CC-bits which are then mapped into a longer CC-bit string (step 710). In the preferred embodiment, the five CC-bits are mapped into thirty-bit CC-bit string. The thirty mapped CC-bits include up to 3 copies of the original 5 CC-bits and their inverses, and are assigned one-to-one to their respective operands within the boolean equation 720 (FIG. 7B.) Specific cc_test values may be used to provide special features. For instance, a cc_test value of all 1-bits corresponds to an unconditional TRUE ("skip") condition, and a cc_test value of all 0-bits corresponds to an unconditional FALSE ("do not skip") condition.

Once the CC-bit string has been mapped, it is applied to the selected boolean equation (step 712). If the result of the application is FALSE, normal processing resumes and the next instruction is executed as defined (step 719). If the outcome is TRUE, the next N instructions will be "skipped."

In the audio processor shown in FIG. 3, the step of "skipping" N instructions is accomplished within the macCC unit 375. An internal counter is loaded with the count operand N (step 714). The macCC unit 375 subsequently processes each instruction as a null instruction (step 716), decrements the skip counter (step 718), and continues this process until the skip counter decrements to from N to zero.

The macCC unit 375 "skips" an instruction by processing it as a null instruction. A null instruction is an instruction which has the same process duration as any other instruction, but performs no operation. In one embodiment, the null instruction generates no output result. In another embodiment, the null instruction does not write its result to memory. In a third embodiment, the first null instruction skips to the $N^{th}$ subsequent instruction at which point the processor waits until the processing time for the N skipped instructions elapses, at which time the $N+1^{st}$ instruction is executed. Other configurations, such as the conventional NOP instruction are also possible and the described embodiments are not exhaustive.

In the preferred embodiment, the steps of receiving the SKIP instruction, retrieving the cc_reg, count and cc_test operands, writing the cc_reg operand to the output operand, selecting the boolean equation as defined by cc_test operand, selecting the cc_reg operand, mapping the cc_reg bits (defined by the cc_test operand bits) to the CC-bits, applying the CC-bits to the boolean equation, and generating a result collectively occur within the one instruction cycle. Further preferred is that each subsequently "skipped" (null) instruction, if any, has a processing duration of one instruction cycle.

It should be noted that during the processing of the SKIP or "skipped" instructions, the output multiplexer 390 does not generate a cc_reg word 380 to be fed back into the macCC unit 375, and SKIP instructions which are themselves "skipped" are processed as null instructions and do not cause the program to branch off the original skip routine.

Figure 7C:
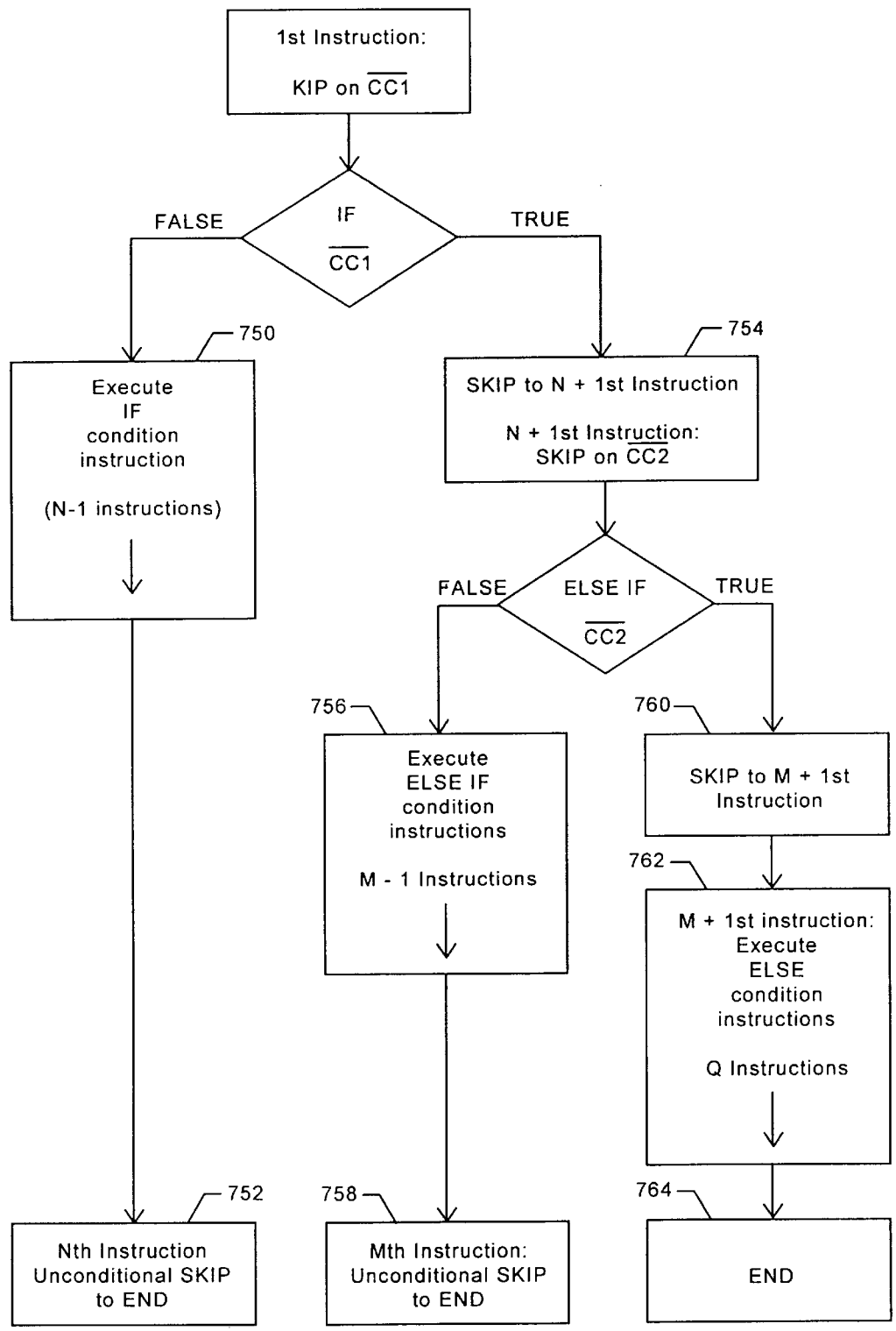
FIG. 7C is a flowchart describing the steps of creating an IF/ELSE IF/ELSE logical block using the SKIP instruction in accordance with the invention.

The SKIP instruction can be used to create IF/ELSE IF/ELSE logical blocks as shown in FIG. 7C. For instance, it may be desirable to execute the logical sequence "IF CC1<execute 1st block>ELSE IF CC2<execute 2nd block>ELSE<execute 3rd block>". In the preferred embodiment, it is desired that the 1st block of instruction are executed only if the result of CC1 is TRUE. However, the SKIP instruction is designed to "skip" on a TRUE result. To satisfy both requirements, the CC1 condition is negated by forming a logically inverted boolean equation representing ~CC1, which is stored in the cc_test operand. This allows the SKIP instruction to "skip" on a TRUE result of ~CC1 which is equivalent to "executing" on a TRUE result of CC1. Thus a first SKIP instruction conditioned on cc_test condition ~CC1 is executed. As described above, the SKIP instruction retrieves the stored cc_reg operand and generates mapped CC-bits therefrom. The mapped CC-bits are applied to a boolean equation, defined by the cc_test operand, and a TRUE or FALSE result occurs.

Referring to FIG. 7C, if CC1 is FALSE, the subsequent block of instructions are executed (step 750). Execution of the first block of instructions represents the IF sequence of the IF/ELSE IF/ELSE block. The last instruction in the IF block is an unconditional SKIP instruction which serves as a JUMP instruction to the end of the IF/ELSE IF/ELSE block (step 752). As described above, an unconditional SKIP instruction can be created by mapping all 1-bits to the boolean equation 720.

At step 754, a second SKIP instruction allows conditional execution of a second set of (ELSE IF) instructions based on an entirely independent condition CC2 that was set before the first IF statement was executed. Since the subsequent instruction skipping does not generate cc_reg operands, the skipping of the first block does note alter the cc_reg stored in the macCC unit 375. Therefore at step 754, it may again be selected and tested against the CC2 condition specified in the ELSE IF block by using the second SKIP instruction with a cc_test operand representing ~CC2, which is logically inverted from CC2 for the aforementioned reasons. Upon a FALSE outcome, the ELSE IF instruction block is executed, shown in step 756. Upon execution of the last instruction of the ELSE IF block, an unconditional SKIP instruction serves as a JUMP out of the IF/ELSE IF/ELSE block (step 758).

Instructions in the ELSE IF block are executed on CC2 being TRUE or equivalently on ~CC2 being FALSE. If both conditions ~CC1 and ~CC2 are TRUE (both CC1 and CC2 are FALSE), the SKIP instruction skips to and executes the ELSE block of instructions (steps 760 and 762). Execution of the last instruction in the ELSE block terminates the IF/ELSE IF/ELSE block and normal processing continues from there (step 764).

D. INTERP Instruction

The INTERP instruction allows calculation of a scaled linear interpolation between two operands A and Y. The INTERP instruction can also implement first order recursive and non-recursive low-pass filters.

Figure 8:
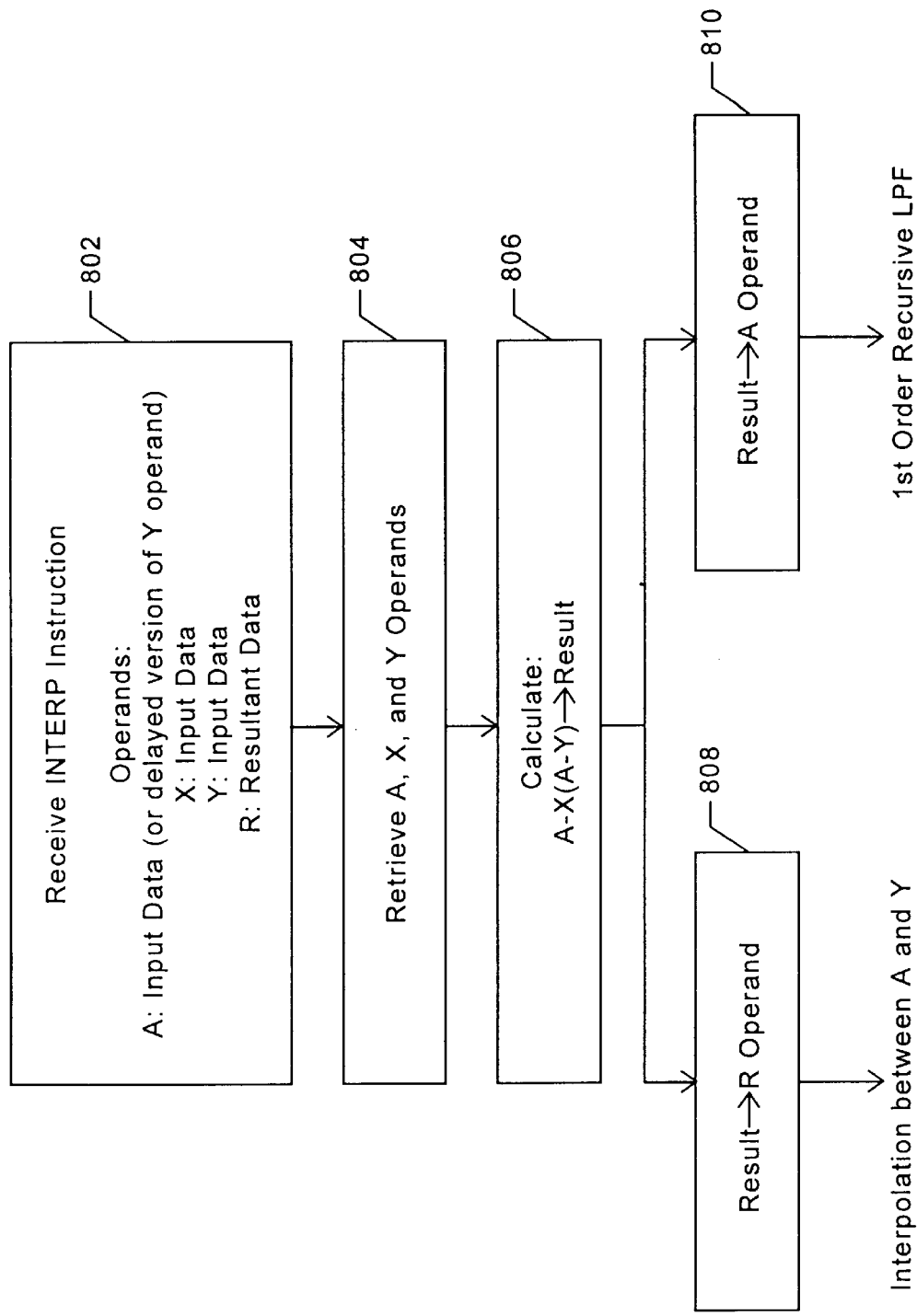
FIG. 8 is a flowchart of an INTERP instruction in accordance with the invention.

FIG. 8 is a flowchart of an INTERP instruction when used to generate a linear interpolation or a first order recursive lowpass filter. Initially in step 802, a INTERP instruction specifying the three input operands A, X, and Y and one output operand R is received into the processor. Next as shown in steps 804 and 806, the specified A, X and Y operand are retrieved and an operation performed represented by equation 3:

$$A\text{-}X(A\text{-}Y) \rightarrow \text{Result} \qquad (3)$$

The result (step 808) indicates the linear interpolation between the A operand and the Y operand, scaled by the X operand.

In the audio processor shown in FIG. 3, the A, X and Y operands have data formats 160 and are supplied to the macCore unit 371 where the arithmetic operation shown in equation 3 is performed. A control signal 330 is transmitted from the operation decoder 320 in response to the INTERP opcode and directs the output multiplexer 390 to select the macCore output. The macCore output is written to the address specified in the R operand address 150. Upon output of the R operand, a cc_reg operand 380 containing the R operand's CC-bits is saved into the macCC unit 375. The stored cc_reg operand 380 has the format 170 as shown in FIG. 1 and contains the aforementioned Zero, Borrow, Saturate, Minus, and Normalized CC-bits.

In the preferred embodiment, the aforementioned steps of receiving the INTERP instruction, retrieving the A, X, and Y operands, calculating the result of equation 3, selecting the macCore output, writing the macCore output to the R operand address, and storing into the macCC unit a cc_reg operand containing the CC-bits of the macCore output collectively occur within one instruction cycle.

If the R operand is fed back into the A operand (step 810), a first-order recursive lowpass filter is created. In the preferred embodiment of FIG. 3, this step is realized in the INTERP instruction by specifying the A operand address 120 as the R operand address.

If the A operand is a one sample period delayed version of the Y operand, application of the above steps 802–808 results in a non-recursive first-order lowpass filter. This step can be realized by specifying in the INTERP instruction an A operand address 120 corresponding to the location where the one sample period delayed version of the Y operand 222 is stored. In this embodiment, the additional step of retrieving a one sample period delayed version of the Y operand also occurs within the same instruction cycle as the previously mentioned steps in sequence 802–808.

While the above is a complete description of the preferred embodiments of the invention, various alternatives modifications and equivalence may be used. For example, any of the disclosed instructions could be used by a processor not specifically designed for processing audio signals, but which has similar requirements of instruction functionality, reuse and user-defined flexibility. It should be evident that the present invention is equally applicable by making appropriate modifications to the embodiments described above. Therefore, the above description should not be taken as limiting the scope of the invention which is defined by the metes and bounds of the appended claims.

What is claimed is:

1. A method for converting linear data into logarithmic data comprising the steps of:

receiving into a processor, a first instruction, said first instruction comprising:

a first address for specifying a first operand comprising linear data;

a second address for specifying a second operand comprising a maximum exponent value; and a third address for specifying an output operand; and converting said linear data to logarithmic data having an exponent value and a mantissa value, said step of converting comprising the steps of:

allocating a Q-bit long exponent field within said output operand, wherein Q is dependent upon said maximum exponent value;

calculating a Q-bit long exponent value;

calculating a mantissa value as a result of said calculation of said Q-bit long exponent value; and storing said exponent value and said mantissa value within said output operand.

2. The method of claim 1 wherein said instruction further comprises a fourth address for specifying a fourth operand comprising a format word, said method further comprises the steps of:

allocating a S-bit long sign field to said output operand;

storing zeros in said S-bit long sign field of said output operand;

applying an absolute value operation to said linear data;

comparing said format word with said original sign bit of said linear data; and transforming said logarithmic data into a binary one's complement when said comparison satisfies a predetermined relationship.

3. The method of claim 1 wherein said step of calculating a Q-bit long exponent value comprises the steps of:

detecting the most significant bit in said linear data; and shifting said most significant bit to the binary floating point, wherein the number of bit positions shifted does not exceed said maximum exponent value;

defining a temporary exponent value as the difference between the maximum exponent value and the number of bit positions shifted;

calculating said Q-bit long exponent value based upon said temporary exponent value, wherein if said linear data is not normalized, said temporary exponent value comprises said exponent value, and wherein if said linear data is normalized, said most significant bit is removed, said linear data is shifted one additional position, said temporary exponent value increments by one, and said temporary exponent value comprises said Q-bit long exponent value.

4. The method of claim 1 wherein said first instruction further comprises an opcode comprising LOG, and wherein said N is a value of thirty-two, and said Q is a value between two and five inclusive.

5. The method of claim 1 wherein said steps of receiving and converting occur during a single instruction cycle.

6. A method for converting logarithmic data into linear data comprising the steps of:

receiving into a processor, a first instruction, said first instruction comprising:

a first address for specifying a first operand comprising logarithmic data having an exponent value and a mantissa value;

a second address for specifying a second operand comprising a maximum exponent value; and converting said logarithmic data to linear data, said step of converting comprising the steps of:
defining said exponent value as having Q-bits, wherein Q is dependent upon said maximum exponent value;
extracting said Q-bit long exponent value from said logarithmic data;
defining the remaining bits of said logarithmic data as said mantissa value; and
normalizing said mantissa value to a linear value, wherein said normalization is based upon said Q-bit long exponent value.

7. A processing unit for converting linear data to logarithmic data, the processing unit comprising:
a memory unit for storing an instruction comprising:
an instruction opcode;
a first address for specifying a first operand comprising linear data; and
a second address for specifying a second operand comprising a maximum exponent value;
a third address for specifying an output operand; and
an execution unit coupled to said memory unit for receiving said instruction, and responsive to said instruction opcode, for allocating within said output operand a Q-bit exponent field and a mantissa field, wherein said Q is dependent upon said maximum exponent value, and for calculating a Q-bit exponent value and a mantissa value for storage within said exponent field and said mantissa field of said output operand.

8. A processing unit for converting logarithmic data to linear data, the processing unit comprising:
a memory unit for storing an instruction comprising
an instruction opcode,
a first address for specifying a first operand comprising logarithmic data having an exponent value and a mantissa value, and
a second address for specifying a second operand comprising a maximum exponent value; and
an execution unit coupled to said memory unit for receiving said instruction, and responsive to said instruction opcode, for defining said exponent value as having Q-bits within said logarithmic data, wherein Q is dependent upon said maximum exponent value, for extracting said Q-bit exponent value from said logarithmic data, for extracting the remaining bits of said logarithmic data as said mantissa value, and for normalizing said mantissa to said linear value based upon said extracted exponent value.

9. A software product for use with a processor responsive to an instruction set, said product comprising:
an instruction belonging to said predetermined set of instructions for controlling said processor to convert, in a single instruction, linear data to logarithmic data having an exponent value and a mantissa value, said instruction comprising:
an instruction opcode for directing said processor to convert said linear data to said logarithmic data;
a first address for specifying said linear data;
a second address for specifying a maximum exponent value of said logarithmic data;
a third address for specifying said logarithmic data, further comprising:
an exponent field of Q bits in which said exponent value of said logarithmic data is stored, wherein said Q is dependent upon said maximum exponent power; and
a mantissa field in which said mantissa value of said logarithmic data is stored; and
a computer readable storage medium for storing said instruction.

10. A software product for use with a processor responsive to an instruction set, said product comprising:
an instruction belonging to said predetermined set of instructions for controlling said processor to convert, in a single instruction, logarithmic data to linear data, said instruction comprising:
an instruction opcode for directing said processor to convert said logarithmic data to said linear data;
a first address for specifying a maximum exponent value of said logarithmic data;
a second address for specifying said logarithmic data, further comprising:
an exponent value expressed in Q-bits, wherein said Q is dependent upon said maximum exponent power; and
a mantissa value; and
a third address for specifying said linear data; and
a computer readable storage medium for storing said instruction.

* * * * *